US011961626B2

(12) United States Patent
Liu et al.

(10) Patent No.: US 11,961,626 B2
(45) Date of Patent: Apr. 16, 2024

(54) FIBER OPTICAL TWEEZERS

(71) Applicant: Worcester Polytechnic Institute, Worcester, MA (US)

(72) Inventors: Yuxiang Liu, Worcester, MA (US); Chaoyang Ti, Shrewsbury, MA (US); Qi Wen, Shrewsbury, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 17/585,056

(22) Filed: Jan. 26, 2022

(65) Prior Publication Data

US 2022/0238246 A1    Jul. 28, 2022

Related U.S. Application Data

(60) Provisional application No. 63/141,839, filed on Jan. 26, 2021.

(51) Int. Cl.
G21K 1/00 (2006.01)
B82Y 35/00 (2011.01)

(52) U.S. Cl.
CPC .............. G21K 1/006 (2013.01); B82Y 35/00 (2013.01)

(58) Field of Classification Search
CPC ......... G21K 1/006; B32B 38/18; G02B 21/32
See application file for complete search history.

(56) References Cited

U.S. PATENT DOCUMENTS

2010/0147456 A1   6/2010   Grier et al.

FOREIGN PATENT DOCUMENTS

| CN | 106898407 A |   | 6/2017  |              |
|----|-------------|---|---------|--------------|
| CN | 106898407 B | * | 11/2018 | ............. G02B 21/32 |
| CN | 108918351 A | * | 11/2018 |              |
| CN | 109300570 A | * | 2/2019  | ............. G21K 1/006 |
| CN | 106772990 B |   | 6/2019  |              |
| CN | 109300570 B | * | 4/2020  | ............. G21K 1/006 |

(Continued)

OTHER PUBLICATIONS

Ti, et al., "Reliable and mobile all-fiber modular optical tweezers", scientific reports, Nov. 18, 2020, pp. 1-11, www.nature.com/scientificreports.

(Continued)

Primary Examiner — David E Smith
(74) Attorney, Agent, or Firm — Armis IP Law, LLC

(57) ABSTRACT

A fiber optic based particle manipulation system employs one or more optical fibers for emanating a refracted optical manipulation signal directed at a target particle for fixing or manipulating the particle for examination, research and manufacturing. A target particle may be a living cell or inanimate sample or compound of matter. An alignment linkage controls optical fibers carrying the manipulation signal for focusing one or more manipulation signals on the target particle. Manipulated particles occupy a fluid medium of either liquid or gas, and are responsive to the manipulation signal based on both photon bombardment and temperature differential from photon contact. The temperature differential is based on surface properties of the target particle, as smooth particles tend to exhibit a greater thermal differential for stronger displacement forces driving or affecting the target particle.

10 Claims, 4 Drawing Sheets

(56) References Cited

FOREIGN PATENT DOCUMENTS

| | | | | |
|---|---|---|---|---|
| CN | 109300570 B | | 4/2020 | |
| CN | 106898047 B | * | 6/2020 | ............. G06T 17/30 |
| WO | WO-2008006765 A1 | * | 1/2008 | ............... G21K 1/00 |

OTHER PUBLICATIONS

International Search Report, PCT/US2022/013861, May 5, 2022, pp. 1-4.

\* cited by examiner

FIBER OPTICAL TWEEZERS

RELATED APPLICATIONS

This patent application claims the benefit under 35 U.S.C. § 119(e) of U.S. Provisional Patent App. No. 63/141,839, filed Jan. 26, 2021, entitled "FIBER OPTIC TWEEZERS," incorporated herein by reference in entirety.

STATEMENT OF FEDERALLY SPONSORED RESEARCH AND DEVELOPMENT

This invention was made in whole or in part with government support under grant No. CBET-1403257 awarded by the National Science Foundation. The government has certain rights in the invention.

BACKGROUND

Optical trapping of dielectric particles by a single-beam gradient force has been attributed to Arthur Ashkin, who received the Nobel Prize in physics for this work (2018). Generally, this work relates to the detection of optical scattering and gradient forces on micron sized particles. Subsequent developments employ a laser or similar optical source to manipulate microscopic particles based on attractive and/or repulsive forces generated between the particle and the surrounding medium based on the optical source.

SUMMARY

A fiber optical based particle manipulation system employs one or more optical fibers for emanating a refracted optical manipulation signal directed at a target particle for fixing or manipulating the particle for examination, research and manufacturing. A target particle may be a living cell or inanimate sample or compound of matter. An alignment linkage controls optical fibers carrying the manipulation signal for focusing one or more manipulation signals on the target particle. Manipulated particles occupy a fluid medium of either liquid or gas, and are responsive to the manipulation signal based on both photon bombardment and temperature differential from photon contact. The temperature differential is based on surface properties of the target particle, as smooth particles tend to exhibit a greater thermal differential for stronger displacement forces driving or affecting the target particle. Research and production facilities benefit from an ability to maintain or move a particle under microscopic observation for response of the target particle to external stimuli, such as biological, chemical or magnetic influences for accurately capturing particle response.

A pair of optical fibers engaged in an alignment linkage may be used to form optical tweezers (OTs), which are important tools widely applied in biology, material science and physics. Miniaturization and integration are desirable trends for the development of OTs. Miniature OTs with an integrated component package can be implemented in systems such as integrated analytical devices, and are beneficial in transitioning optical trapping technology from the research lab to practical applications.

Despite the importance, miniaturization and integration of conventional optical tweezers has met with shortcomings. Conventional OTs are built on a microscope platform with a strongly focused laser beam and an objective lens with a high numerical aperture (NA), the latter of which is required for both creating a trap and detecting the trapped particle position. Therefore, traditional OTs inherit the limitations of the high NA objective and free-space optics, including the bulky size, short working distance, integration complexity and susceptibility to environmental fluctuations.

Accordingly, configurations herein substantially overcome the shortcomings of conventional particle manipulation practices by providing a fiber optical particle manipulation device, including one or more optical fibers emanating from an optical source, each having a finished end on the optical fiber distal from the optical source. An alignment linkage is engaged with the optical fiber for manipulating the finished end, such as a pivotal, robotic or manually disposed control attached near the finished end for directing the emanated manipulation signal. A signal generator in the optical source transmits the manipulation signal to the distal, finished end. The finished end is adapted to direct the manipulation signal towards a particle for movement or fixation, and may emanate from 1 or more optical fibers; 2 in the case of a particle trap.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
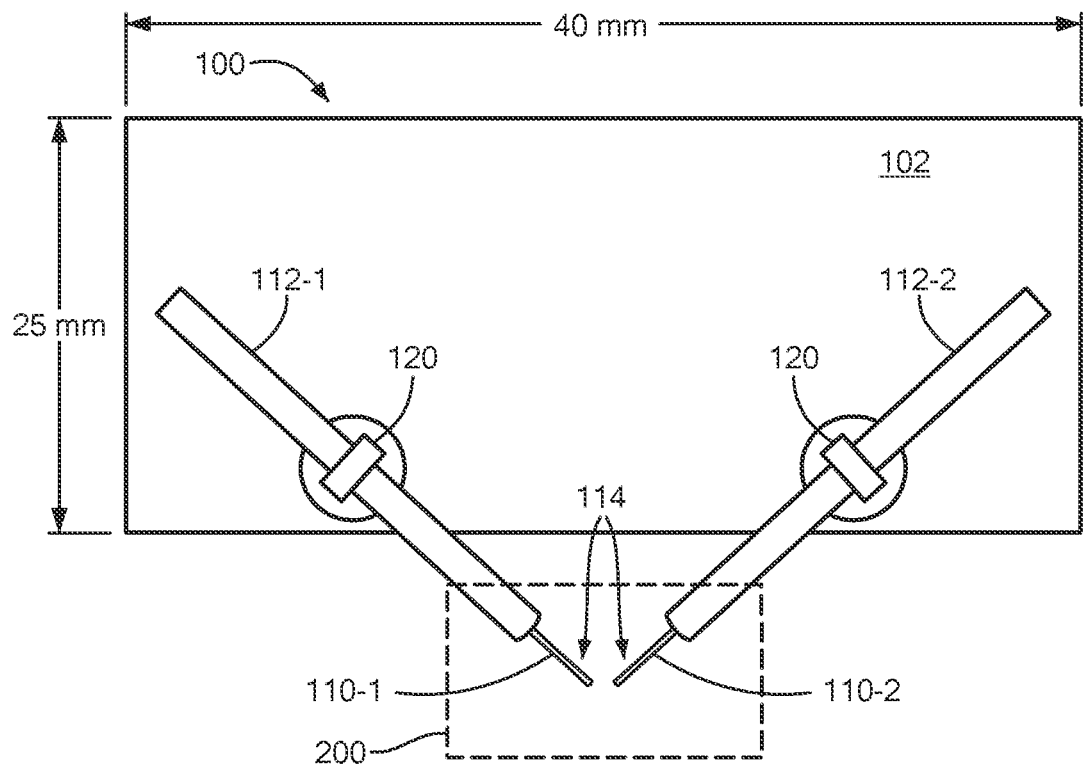
FIG. 1 is a context view of an example configuration of the fiber optical particle manipulation device (optical tweezers)

Optical tweezers have been employed to apply and measure forces to micro/nanoscale particles. For example, optical tweezers are commonly used in biological and physical research, such as the study of the motion of individual motor proteins, mechanical properties of polymers and biopolymers, tests of the fundamental nature of gravity, and attractive forces between like-charged particles.

Conventional, commercialized optical tweezers are based on objective lenses and microscopes. They are expensive, bulky, and difficult to be integrated. In addition, users are required to undergo substantial training to operate optical tweezers.

The modular fiber optical tweezers claimed herein are designed to solve the abovementioned problems and have demand potential in industry, research labs, and education. Modular FOTs are 1) miniaturized and portable, 2) easy-to-use, 3) economic and readily operable without extensive training.

Conventional approaches to OT and particle manipulation suffer from shortcomings that arise from the intrinsic limitations of objective lenses, such as bulkiness, short working distances, and integration difficulty with microscopes, such as substantial mass and poor flexibility. It is challenging for traditional OTs to be operated outside a lab environment due to the free space optics, which significantly limit their applications. In addition, the operation of commercially available traditional optical tweezers requires an air cushion table and a full laboratory environment.

Configurations herein present a maintenance-free, all-fiber modular optical tweezers (AFMOTs) system that can reliably create an optical trap that is freely movable on a sample substrate. It includes two inclined optical fibers pre-aligned and permanently fixed to a centimeter-scale common base, board or mounting surface, where the optical trap is located at the tips of the two fibers, well below the base. Such a modular design eliminates the need of the fiber alignment maintenance and free-space optics, while the mobility of the trap is reserved with the performance reliability. Compared with conventional counter-propagating fiber trapping systems, which may also be a modular system, the optical trap created by AFMOTs can be freely moved inside the medium, pick up a particle lying on a substrate or suspended in a gaseous or liquid medium, and move the particle around on the substrate. In addition to the system integration with devices such as so-called lab-on-a-chip devices and microscopes, the combination of trap mobility and reliability bestows on the AFMOTs great potential in finding applications that are challenging for other fiber optical tweezers. For example, AFMOTs can be used in the biomechanical investigation of cells in their original locations in the cultured media or tissues, as well as long-period applications such as the cell studies during its growth and division. As a demonstration for the applications, AFMOTs may be used as a functional tool to "probe" the mechanical properties of cells in their original locations in the cultured medium.

FIG. 1 is a context view of an example configuration of the fiber optical particle manipulation device (optical tweezers). Referring to FIG. 1, A fiber optical particle manipulation device 100 includes one or more optical fibers 110-1 . . . 110-2 (110 generally), each having a corresponding actuator 112-1 . . . 112-2 (112 generally) emanating from an optical source, and a finished end 114 on the optical fiber distal from the optical source. A base 102 has alignment linkage 120 to engage each optical fiber 110 via the respective actuator 112 or support for manipulating the finished end 114. For example, in a fixed trap arrangement, the alignment linkage 20 maintains the relative fixed position between opposed fibers 110. A signal generator in the optical source, discussed further below, transmits a manipulation signal, or optical signal, to the finished end for directing the manipulation signal towards a particle.

In the example of FIG. 1, the modular FOTs is a miniaturized system block with the total length around one inch, width within one inch, and thickness within a quarter inch. A fixed alignment of the actuators 112 for particle trapping provides that it is user-friendly and easy to operate both in and outside a lab environment. By using different types of fibers in the same system design, the modular FOTs have various modalities that are suitable for trapping and manipulating particles with different sizes. Specifically, 10~100 um particles can be trapped by modular FOTs with cleaved fibers (fibers with a flat surface), 3~20 um with lensed fibers, and 500 nm~5 um using chemically etched tapered fibers. It is noted that the size range of the trappable particles (500 nm~100 um) covers the sizes of many biological particles, such as bacteria, human cells, animal and plant cells, and yeast cells.

Figure 2:
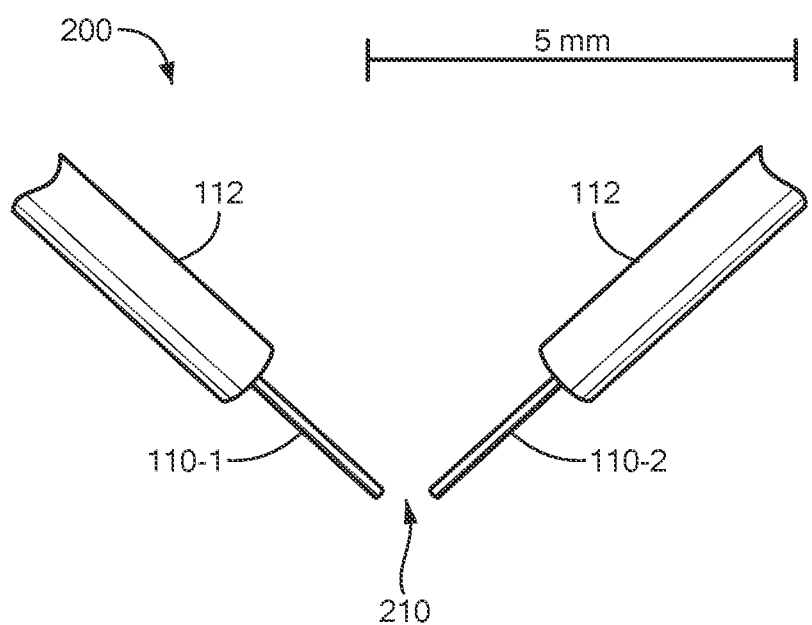
FIG. 2 shows the optical fibers in the device of FIG. 1.

FIG. 2 shows the optical fibers in the device of FIG. 1 based on detail block 200. Referring to FIGS. 1 and 2, the particular configuration of FIGS. 1 and 2, two optical fibers 110 with an inclined angle are pre-aligned and permanently fixed on the base 102. Thus, a 3D optical trap is created reliably and repeatably by a modular system with a footprint around 85×50×7 mm, The modular form factor therefore allows a straightforward mounting on or within the visual field of microscopes. The position of the pre formed optical trap 210 can be easily maneuvered by controlling the position of the base 102. In addition to creating a trap, the AFMOTs enable the fiber-based particle position detection with a resolution of 2 nm. Alternatively, each actuator may be independently positioned.

Figure 3:
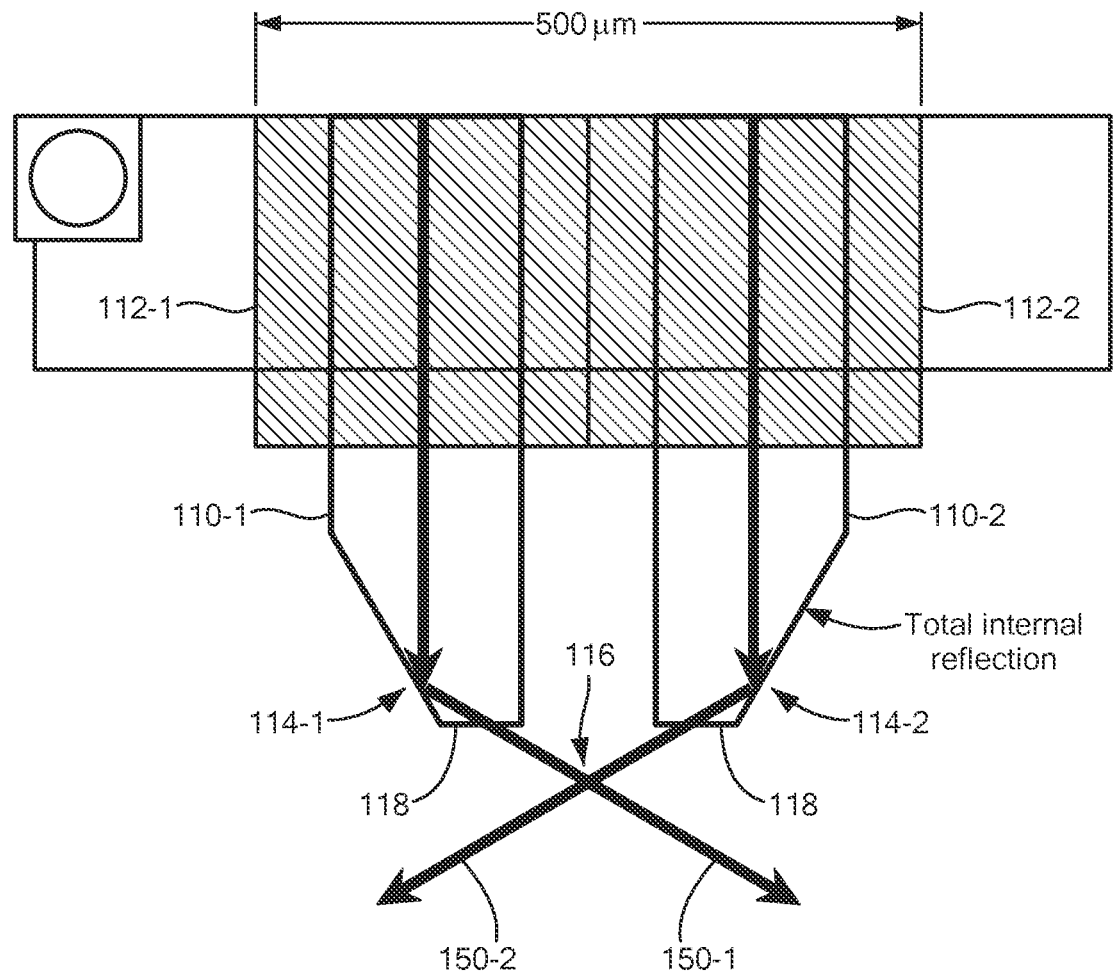
FIG. 3 is a schematic diagram of optical fibers as in FIG. 2.

FIG. 3 is a schematic diagram of optical fibers as in FIG. 2. Referring to FIGS. 1-3, the optical fiber 110 emits a manipulation signal based on a reflection or refraction effected by a treatment of the finished end. In the disclosed approach, the finished end 114 is at least one of cleaved, lensed, or etched for directing photons in the manipulation signal 150-1 . . . 150-2 (150 generally). In the example configuration, the optical fiber 110 is a cleaved single-mode fibers such as Corning® HI 1060. The finished end has an emanation surface 118 resulting in a predetermined refraction of emitted photons for defining a trap 116 based on an intersection of the multiple manipulation signals. Depending on the processing, polishing etc. of the finished end, the manipulation signal 150 may reflect or refract within the fiber, as shown in FIG. 3 to aim or direct the emanated photons.

Compared with traditional OTs, AFMOTs with cleaved fibers are a better candidate to deform cells of tens of micrometers in size. The main reason is that forces generated by AFMOTs are distributed over a large illuminated area of cell surface within the spot size, which is around 10 µm. By comparison, the trap of traditional OTs is at a diffraction-limit spot on the order of sub-µm. In order to achieve the same total optical force to deform cells, the optical stress and required intensity by AFMOTs are much smaller than those by traditional OTs, although the optical power is similar. Therefore, the AFMOTs promise to be a safer tool for cells, because the photodamage is linearly dependent on the optical intensity.

When higher optical forces are required to deform cells, AFMOTs allow a larger increase in power before possible photodamage occurs. As another important advantage, AFMOTs can deform cells without the help of any force handle or surface treatment, while beads are attached to cells as force handles by most traditional OTs for cell mechanics study. No bead attachment is preferred because of the following reasons. First, the physical contact may introduce contamination and undesired physical or chemical modifications to cell surfaces. Secondly, optical forces applied onto beads give rise to concentrated forces applied on the cell membranes, which can develop nonlinear and non-uniform membrane stress distribution and in turn bring challenges to stress characterization induced by the bead-mediated point loading.

In addition, these concentrated forces are more likely to cause physical damage and disruption of cells than distributed forces. By comparison, the AFMOTs applies distributed forces directly on cell membranes without any physical contact or additional force handles, which can minimize the cell disruption and allow cells to deform more evenly. With all the aforementioned reasons, AFMOTs are a unique tool that is safer and more suitable for cell mechanics study than traditional OTs. Cells as small as 8 µm in diameter may be trapped/manipulated by the optical fibers 110. A typical optical power is in the range of 30-250 mW.

Figure 4:
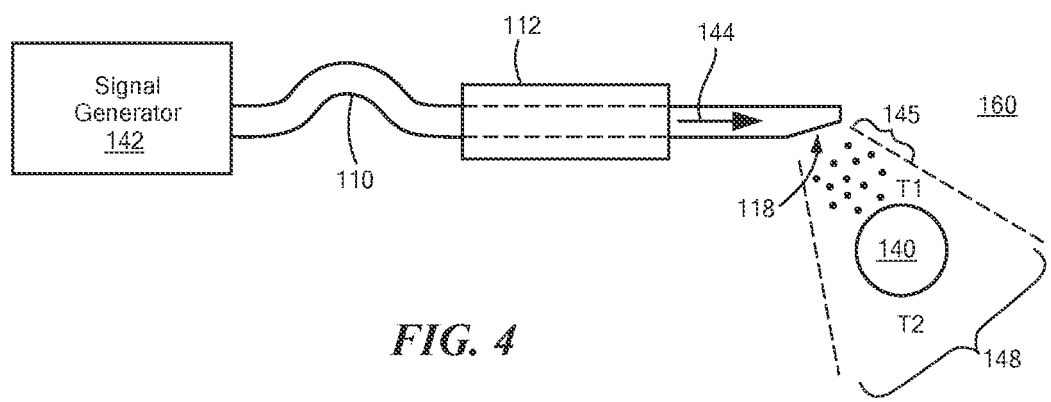
FIG. 4 shows particle manipulation using optical fibers as in FIG. 3 based on a thermal differential.

FIG. 4 shows particle manipulation using optical fibers as in FIG. 3 based on a thermal differential. In the disclosed approach, the particle exists in a fluid medium 160, which may be either a liquid or gaseous medium. A signal generator 142 in the optical source for has circuitry and controls for transmitting a manipulation signal 144, such as a laser, to the finished end 114, such that the finished end is adapted to direct the manipulation signal towards a particle 140. Based on the position of the optical fiber 110 by the actuator 112, the signal generator 142 emits a manipulation signal 144, which causes a photon emission pattern 148 or dispersion based on the emanation surface 118. The manipulation signal 144 from the signal generator 142 energizes photons 145 in the manipulation signal for disposing the particle 140 in response to photonic bombardment from a dispersion pattern 148. The dispersion pattern 148 results from the finishing of the emanation surface for dispersing the photons 145 in a wide or narrow angle to manipulate and trap the particle 140.

When the medium 160 is gaseous, vacuum or near vacuum, the manipulation signal from the signal generator energizes photons 145 in the manipulation signal for disposing the particle 140 in response to a thermal differential adjacent the particle. As photons 145 strike or engage the particle, there is a tendency to generate heat from the impact. This heat causes a thermal differential resulting from increased thermal activity at an impact location T1 on a target particle 140, in contrast to the opposed side T2. A net thermal differential results from T1>T2.

Figure 5:
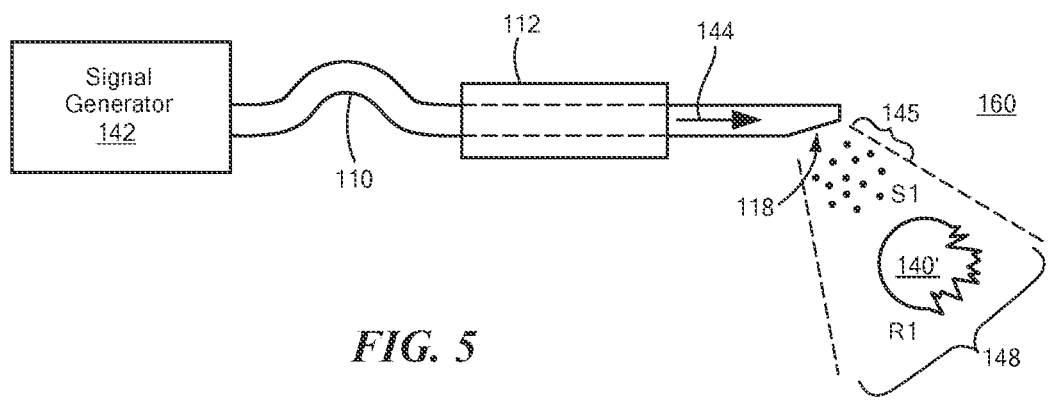
FIG. 5 shows particle manipulation using optical fibers as in FIG. 3 based on identification of surface features.

FIG. 5 shows particle manipulation using optical fibers as in FIG. 3 based on identification of surface features. The signal generator 142 emanates the signal 144 for transport over the optical fiber 112 for refraction and dispersion based on the finishing of the emanation surface 118. The manipulation signal 144 is directed towards the particle based on a surface characteristic of a target particle 140', such that the target particle receives photons 145 in the manipulation signal 144. Surface features such as peaks and roughness affect the temperature differential. A smooth side S1 results in a greater temperature differential than the same photon engagement with a rough side R1, due to the tendency of the surface roughness, peaks, valleys and the like to absorb heat. Therefore, a temperature differential ΔS is greater than the rough side temperature differential ΔR, all other parameters being equal. The actuators 112 may be fixed, as in FIG. 1, or may responds to the alignment linkage, however the signal 144 and intensity is based on a morphology, or smooth/rough surface characteristics of the target particle 140' For example, the alignment linkage may be configured to direct the manipulation signal 144 towards a smooth side Si of the target particle 140', as the smooth side exhibits a greater thermal differential than a course side of the target particle.

Figure 6:
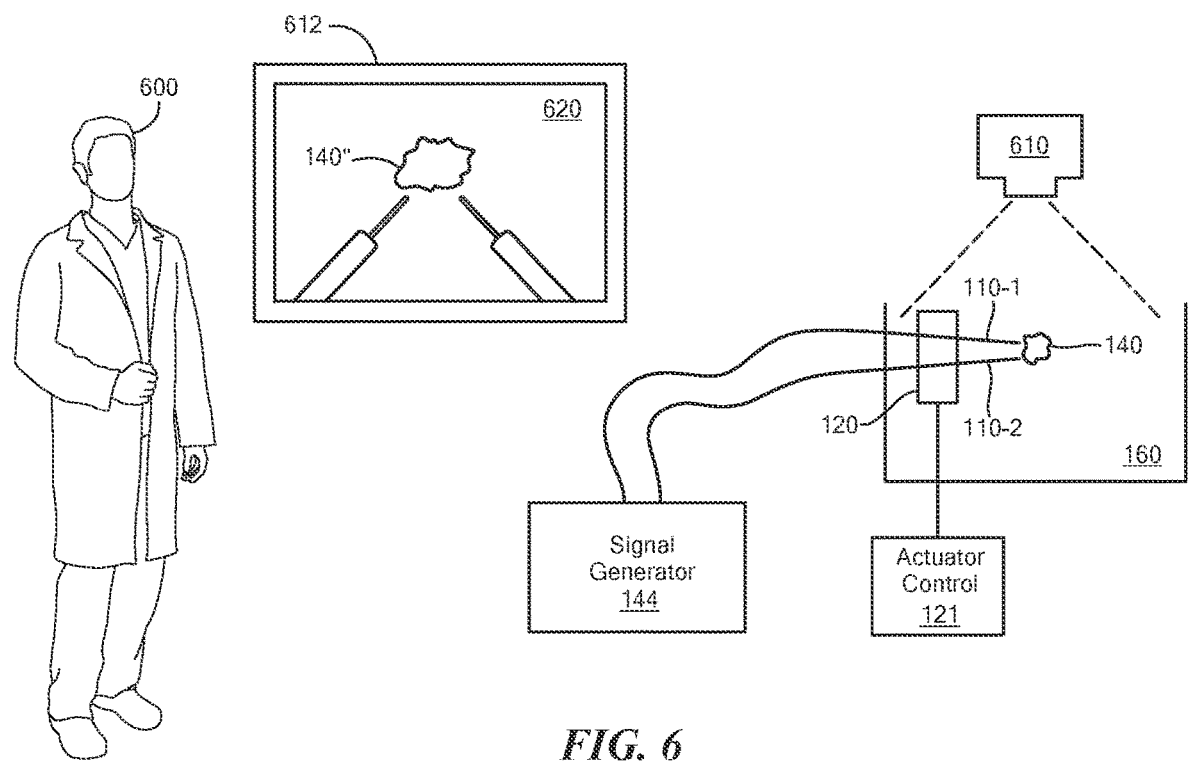
FIG. 6 shows a system for rendering particle manipulation feedback with optical fibers as in FIGS. 1-5.

FIG. 6 shows a system for rendering particle manipulation feedback with optical fibers as in FIGS. 1-5. As the manipulated particles 140, 140' may span a considerable size range, from around 500 nm to 100 um, depending on the configuration of the finished end, visualization of the manipulated fibers is a feature. Referring to FIGS. 1-6, a feedback apparatus is configured for rendering particle information of a target particle for directing the manipulation signal 144 based on surface properties of the target particle 140, 140'.

Referring to FIG. 6, and continuing to refer to FIGS. 1-5, the particle manipulation method and device has particular advantages in a research environment for cell research, dust, airborne contaminants and other contexts where manipulation and/or fixation of a small particle or cell is utilized. A researcher 600 utilizes a magnification device 610, such as a microscope, video camera/magnifier, or other capability for displaying/visualizing the particle 140 under observation onto a rendering device 612. One or more actuators 112 defines the alignment linkage 120 for directing and focusing the manipulation signal 144 for disposing the particle 140 based on at least one of a temperature differential exhibited in the fluid medium and a surface feature of the target particle. In the expected configuration, the particle 140 is in a gaseous or vacuum space, and the actuators 112 may hold or steer/manipulate the particle in a particular direction. A visualized response 620 on the rendering screen or device is readily observable for guiding the actuators from an actuator control 121 or otherwise performing particle based research activities.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A device for microscale and nanoscale particle manipulation, comprising:
   an optical fiber emanating from an optical source;
   a finished end on the optical fiber distal from the optical source, the finished end having a flat surface for refraction;
   an alignment linkage engaged with the optical fiber for manipulating the finished end;
   a signal generator in the optical source for transmitting a manipulation signal to the finished end, the finished end adapted to direct the manipulation signal; and a feedback apparatus, the feedback apparatus configured for rendering particle information of a target particle for directing the manipulation signal based on surface roughness of the target particle.

2. The device of claim 1 wherein the particle exists in a fluid medium.

3. The device of claim 1 wherein the fluid medium is a gaseous medium.

4. The device of claim 1 wherein the finished end is at least one of cleaved, lensed, or etched for directing photons in the manipulation signal.

5. The device of claim 1 wherein the finished end has an emanation surface resulting in a predetermined refraction of emitted photons.

6. The device of claim 1 wherein the manipulation signal from the signal generator energizes photons in the manipulation signal for disposing the particle in response to photonic bombardment.

7. The device of claim 1 wherein the manipulation signal from the signal generator energizes photons in the manipulation signal for disposing the particles in response to a thermal differential adjacent the particle, the thermal differential resulting from increased thermal activity at an impact location on a target particle.

8. The device of claim 1 wherein the manipulation signal is directed towards the particle based on a surface characteristic of a target particle, the target particle receiving photons in the manipulation signal.

9. The device of claim 2 wherein the alignment linkage directs the manipulation signal for disposing the particle based on at least one of a temperature differential exhibited in the fluid medium and a surface feature of the target particle.

10. A device for microscale and nanoscale particle manipulation, comprising:
   an optical fiber emanating from an optical source;
   a finished end on the optical fiber distal from the optical source;
   an alignment linkage engaged with the optical fiber for manipulating the finished end; and
   a signal generator in the optical source for transmitting a manipulation signal to the finished end, the finished end adapted to direct the manipulation signal towards a particle wherein the alignment linkage is configured to direct the manipulation signal towards a smooth side of the target particle, the smooth side exhibiting a greater thermal differential than a coarse side of the target particle.

* * * * *